United States Patent [19]

Sawa

[11] Patent Number: 5,097,725
[45] Date of Patent: Mar. 24, 1992

[54] SHIFT CONTROL SYSTEM FOR AUTOMATIC TRANSMISSIONS

[75] Inventor: Kenji Sawa, Hiroshima, Japan

[73] Assignee: Mazda Motor Corporation, Hiroshima, Japan

[21] Appl. No.: 727,380

[22] Filed: Jul. 5, 1991

Related U.S. Application Data

[63] Continuation of Ser. No. 384,712, Jul. 25, 1989.

[30] Foreign Application Priority Data

Jul. 25, 1988 [JP] Japan .................. 63-183687
Jul. 29, 1988 [JP] Japan .................. 63-189946

[51] Int. Cl.⁵ .................. F16H 59/22; F16H 59/48
[52] U.S. Cl. .................. 74/866; 364/424.1
[58] Field of Search .................. 74/866; 364/424.1

[56] References Cited

U.S. PATENT DOCUMENTS

| | | | |
|---|---|---|---|
| 4,669,335 | 6/1987 | Matsuoka et al. | 74/866 |
| 4,732,055 | 3/1988 | Takuo et al. | 74/866 |
| 4,823,643 | 4/1989 | Koshizawa | 74/866 |
| 4,829,435 | 5/1989 | Isono | 364/424.1 X |
| 4,845,621 | 7/1989 | Kawata et al. | 364/424.1 X |
| 4,846,020 | 7/1989 | Kondo et al. | 74/866 |
| 5,022,286 | 6/1991 | Takizawa | 74/866 |

FOREIGN PATENT DOCUMENTS 52-20630 6/1977 Japan .

Primary Examiner—Leslie A. Braun
Assistant Examiner—Khoi Q. Ta
Attorney, Agent, or Firm—Fleit, Jacobson, Cohn, Price, Holman & Stern

[57] ABSTRACT

A shift control system for shifting an automatic transmission of a vehicle up or down by supplying an actuator of the transmission with a shift control signal provided according to a predetermined shift control schedule. The shift control system includes a retarder for delaying the shift control signal for a predetermined time when current vehicle speed is lower than a specified speed and a shift canceling arrangement for canceling the shift control signal when the vehicle slows down with a throttle valve near or in its idle position. The control system further includes a delay canceling arrangement for disabling the retarder so as not to delay the shift control signal when current vehicle speed is higher than the specified speed within the predetermined time.

11 Claims, 7 Drawing Sheets

SHIFT CONTROL SYSTEM FOR AUTOMATIC TRANSMISSIONS

This is a continuation of application Ser. No. 07/384,712, filed July 25, 1989.

FIELD OF THE INVENTION

The present invention relates to a shift control system for an automatic transmission of an automotive vehicle.

BACKGROUND OF THE INVENTION

Automatic transmissions are designed to adapt the power of an engine to meet automatically varying road conditions. A typical automatic transmission is provided with electromagnetic operating means for causing the automatic transmission to shift up or down according to a predetermined shift control schedule depending upon road speed, throttle position and engine load. In an attempt to prevent the automatic transmission from hunting upon shifting, it is popular to design the automatic transmission to shift in accordance with a specifically designed up- and down-shift control pattern or schedule in which a hysteresis is provided between up- and down-shift control lines. However, the automated transmission thus designed may still tend to hunt, in particular responsive to a slight opening or closing of an accelerator pedal when the vehicle is traveling at a constant speed. To avoid such hunting upon shifting, for example upshifting, it was thought that the upshift of the automatic transmission should be delayed for a predetermined or preselected period of time when the vehicle is traveling in a low speed range, where the tendency for hunting is more noticeable.

In automotive vehicles equipped with automatic transmissions, it is important to make efficient use of the braking effect of the engine without manually changing gear to slow down the vehicle. To obtain high engine braking efficiency, it is sufficient to operate the vehicle in a low gear speed range. In view of this, it was thought that an automatic transmission should be controlled to shift itself in accordance with an automatic shift control pattern or schedule in which a lower part of a particular gear range extends to a specified vehicle speed in the high gear range one-step higher than the gear range. Such an automatic shift control schedule is known from Japanese Unexamined Patent Publication No. 52-20630 entitled "Automatic Transmission" laid open June 4, 1977.

A drawback caused by delaying the shift control signal for a predetermined period of time, however, is that the automatic transmission still tends to hunt, upon deceleration, when the throttle valve nears or is in its idle position. Thus, when the vehicle slows down or is decelerated in such a way as to change the throttle valve from a certain throttle opening to its idle position, it often happens that the automatic transmission shifts transitionally up from a lower gear range into a higher gear range and eventually down again into the lower gear range. In such a case, a downshift control signal is delayed for a time until after the output of an upshift control signal. This leads not only to undesirable hunting of the automatic transmission upon shifting but also to an interim traveling of the vehicle in a high gear range, resulting in decline in braking effect of the engine. This decline of braking effect can be significant in an automatic transmission of the type that is controlled in accordance with a shift control pattern as described in the above Publication.

SUMMARY OF THE INVENTION

It is, therefore, a primary object of the present invention to provide a shift control system for an automatic transmission of an automotive vehicle in which upshift is delayed for a predetermined period of time.

It is another object of the present invention to provide a shift control system for an automatic transmission of an automotive vehicle which prevents the automatic transmission from hunting when the vehicle is decelerated with the accelerator pedal completely or almost completely released.

The above and other objects are achieved by a shift control system for up or down shifting of a multi-step automatic transmission of an automotive vehicle by actuating electromagnetic means of the automatic transmission with a shift control signal provided according to predetermined shift control schedule. The automatic transmission shift control system includes delaying means for delaying a shift control signal for a predetermined period of time when an operating speed of the automotive vehicle is lower than a specified speed and shift canceling means for canceling the shift control signal when the automotive vehicle is decelerated with the throttle valve near or in its idle position.

The automatic transmission control system includes, either in addition to, or otherwise in place of, the above mentioned shift canceling means, delay canceling means for disabling the delaying means so as not to delay the shift control signal when an operating speed of the automotive vehicle is higher than the specified speed.

The predetermined shift control schedule includes an upshift control line, and a downshift control line if desired, defining a lower portion of a low speed range extending to the specified speed within a high speed range one-step higher than the low speed range.

BRIEF DESCRIPTION OF THE DRAWINGS

Still other objects of the invention and more specific features will become apparent to those skilled in the art from the following description of the preferred embodiment considered together with the accompanying drawings wherein like reference characters have been used in the different figures to denote the same parts and in which.

DESCRIPTION OF THE PREFERRED EMBODIMENT

Because multi-step automatic transmissions are well known, the present description will be directed in particular to the operation of a transmission in accordance with the present invention. It is to be understood that elements of the transmission described herein and which are not specifically shown or described can take various forms well known to those skilled in the automotive vehicle art.

Figure 1:
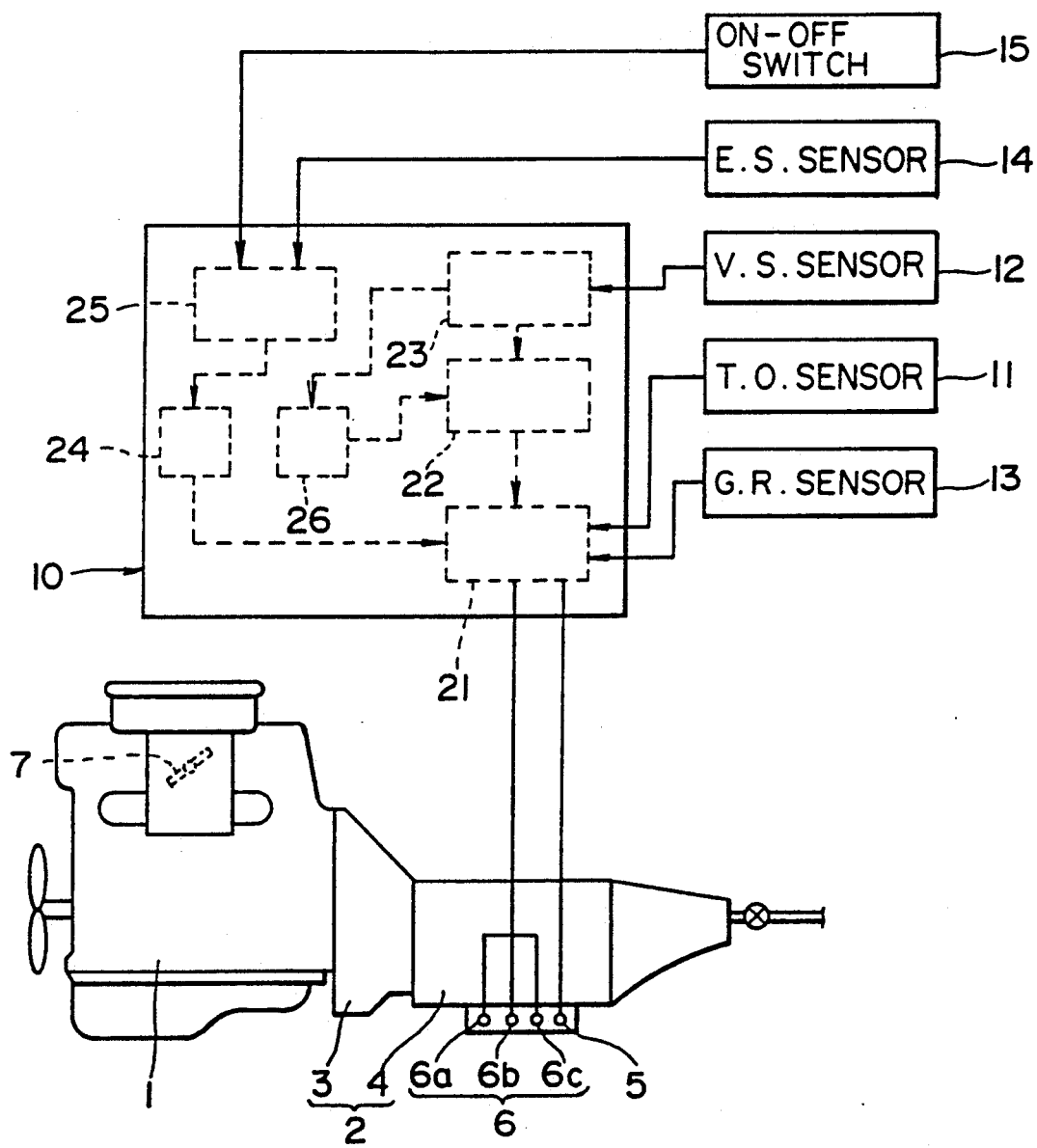
FIG. 1 is a schematic, part block diagram, of an automatic transmission control system in accordance with a preferred embodiment of the present invention.

Referring now to the drawings in detail, particularly to FIG. 1, an internal combustion engine 1 having an automatic transmission control system in accordance with a preferred embodiment of the present invention is shown, and is provided with a multi-speed, for example four forward speeds, automatic transmission 2 for transmitting engine output to a propeller shaft (not shown). The automatic transmission 2 consists of a torque converter 3 and a transmission gear arrangement 4 using a planetary gear set well known in the art. The torque converter 3 is equipped with a lockup unit or clutch (not shown) which is well known in structure and operation such as a solenoid controlled clutch. A solenoid 5 is controlled by a control module 10, for example consisting of a microcomputer, to actuate a hydraulic control system so as to mechanically lock or unlock the torque converter 3. The four-speed automatic transmission 4 has transmission operating means 6 consisting of a plurality of, for example in this embodiment three, solenoids 6a-6c which are energized in various combinations to govern or actuate the hydraulic control system for shifting the automatic transmission 4 into the various gear ranges.

Control module 10 creates various combinations of energization of the solenoids 6a-6c of the transmission operating means 6 so as to shift the automatic transmission into the various speed ranges. That is, the control module 10 is connected to outputs of several switches and sensors such as a throttle opening (T.O.) sensor 11, a vehicle speed (V.S.) sensor 12, a gear position (G.R.) sensor 13, an engine speed (E.S.) sensor 14 and an on=-off switch 15. These sensors 11 to 14 and switch 15 can take various well known forms. The throttle position sensor 11 sends a appropriate signal to the control module 10 indicating an opening of a throttle valve 7 of an fuel injection system. The vehicle speed sensor 12 sends an appropriate signal to the control module 10 indicating the speed at which the vehicle is traveling, and the gear position sensor 13 sends an appropriate signal to the control module 10 indicating in which gear position or speed range the automatic transmission 2 is operating. The on-off switch 15 is turned on when the accelerator pedal is completely or almost completely released. If the on-off switch 15 is on while the engine speed sensor 14 detects a current operating speed of the engine 1 greater than a previously specified speed in r.p.m., the control module lo determines that the engine 1 is in a deceleration condition (which is hereinafter referred to as a near-idle deceleration condition).

Control module 10 is basically provided with a microcomputer including a central processing module (CPU), ROM, RAM, a clock timer, an A/D converter and a D/A converter, and an input-output (IO) interface which are all well known in structure to those having ordinary skill in the art and need not be explained in detail. The control module 10 is functionally structured as shown in block in FIG. 1. That is, the control module 10 includes shift control means 21 which provides the transmission operating means 6 with a shift control signal so as to create a desired combination of energization of the solenoids 6a-6c in accordance with a predetermined shift control schedule. Delaying means 22 functions to delay the shift control signal from the shift control means 21 for a predetermined period of time when speed detecting means 23 verifies that a current speed of the automotive vehicle detected by the vehicle speed sensor 12 is lower than a previously specified speed. Shift canceling means 24 functions to cancel out the shift control signal from the shift control means 21 if the automotive vehicle is in a near-idle deceleration condition. For verification, deceleration verifying means 25 receives signals from the engine speed sensor 14 and the on-off switch 15 to verify whether or not the automotive vehicle is in the near-idle deceleration condition. If the on-off switch 15 is o while the engine speed sensor 14 detects an operating speed of the engine 1 greater than a previously specified speed, the deceleration verifying means 25 decides that the automobile vehicle is operated in the near-idle deceleration condition and causes the shift signal canceling means 24 to cancel out the shift control signal.

Control module 10 further includes delay canceling means 26 which functions to disable the delaying means 22 so as not to delay the shift control signal when a current operating speed of the automotive vehicle is higher than the previously specified speed within the lapse of the predetermined period of time.

Figure 2:
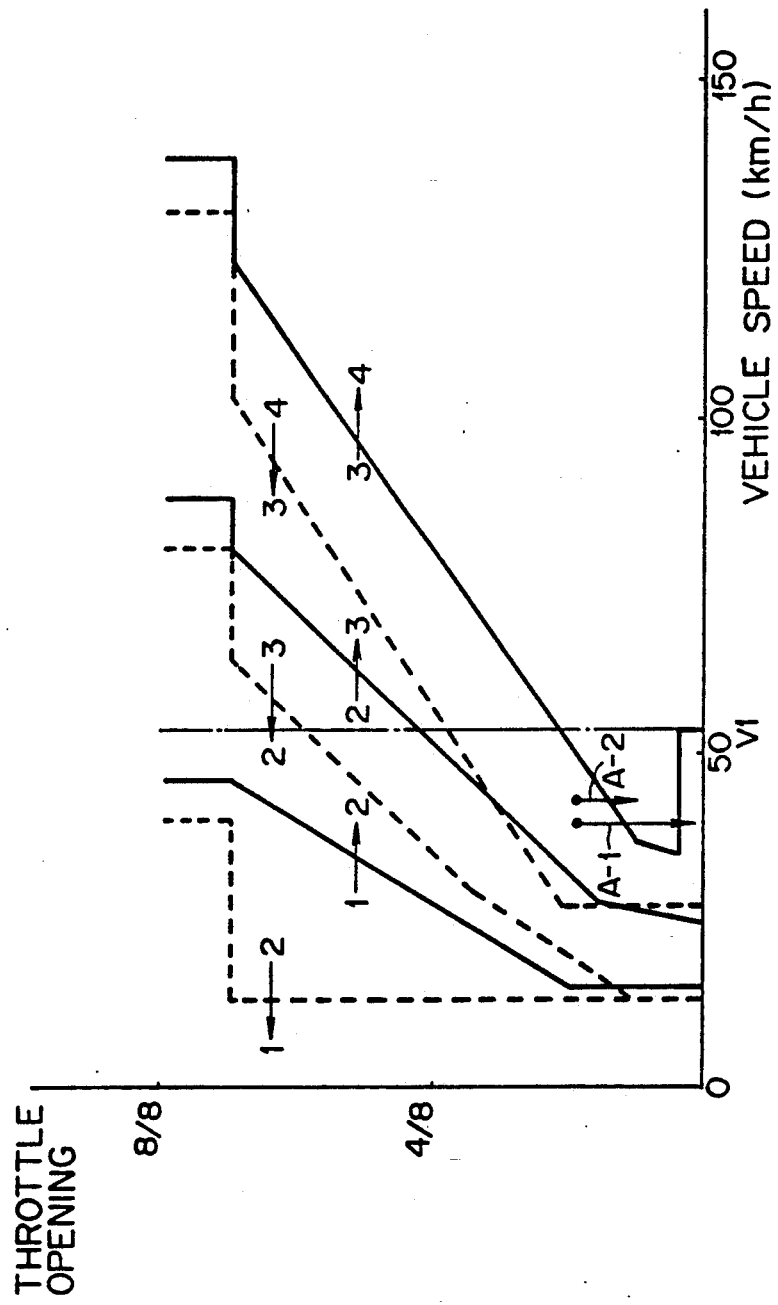
FIG. 2 is a diagram showing an example of a shift control schedule for the automatic transmission control system shown in FIG. 1.

Shift control of the automatic transmission is executed in accordance with automatic shift patterns or schedules shown as an example in FIG. 2, including six control lines namely :a 1-2 upshift control line (1→2), a 2→3 upshift control line (2→3), a 3-4 upshift control line (3→4), a 2-1 downshift control line (2→1), a 3-2 downshift control line (3→2) and a 4-3 downshift control line (4→3). Data relating to the shift schedules for the automatic transmission 1 is stored in ROM of the control module 10. As apparent from the diagram shown in FIG. 2 illustrating the shift schedules, the 3-4 upshift schedule line (3→4) along which the automatic transmission 4 shifts from a third gear to a fourth gear is designed to have a lower part extending within a fourth gear speed range to a previously specified vehicle speed V1 in a near-idle throttle position. The remaining shift control lines are conventionally designed.

Figure 3:
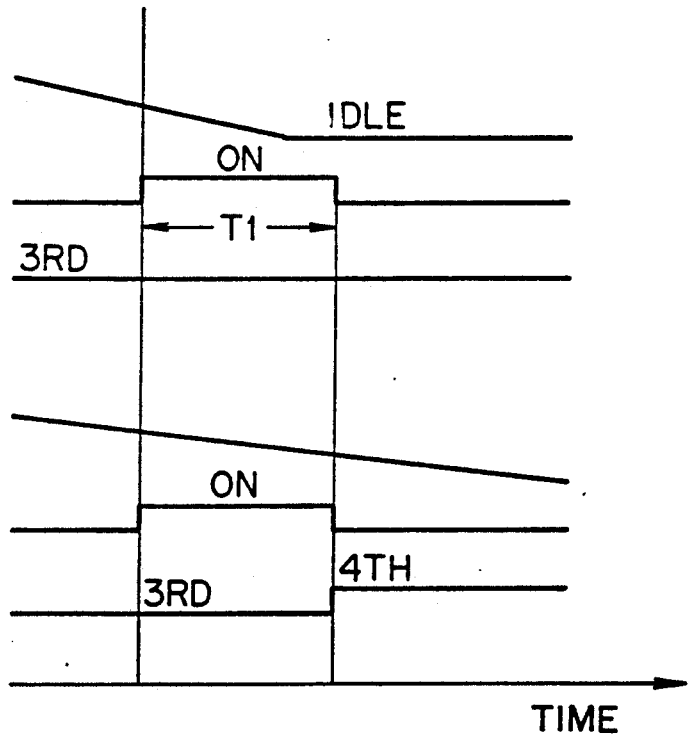
FIG. 3 is a timing chart for controlling the automatic transmission control system in accordance with the shift control schedule shown in FIG. 2.

Two examples of engine operation modes are illustrated and described herein in detail. One of the examples is designated by character A-2 in FIGS. 2 and 3 and represents a situation in which the accelerator pedal is lightly operated to change the opening of the throttle valve 7 from the third gear speed range to the fourth gear speed range leaving the vehicle continuously in motion at a speed lower than the previously specified speed V1 and in which a predetermined period of time T1 has elapsed from a time immediately after the transition of the opening of the throttle valve 7 into the fourth gear speed rang while the throttle valve opening decreases in the fourth gear speed range. On the other hand, the other example of engine operation is designated by a character A-1 in FIGS. 2 and 3 and represents a situation in which the vehicle is continuously in motion at a speed lower than the previously specified vehicle speed V1 and the accelerator pedal is completely or almost completely released so as to change the throttle valve 7 from a throttle position where the opening of the throttle valve 7 is in the third gear speed range to its idle position, before the lapse of the predetermined period of time T1 from a time immediately after the transition of the opening of the throttle valve 7 into the fourth gear speed range. In this case, because the speed of the engine in r.p.m. is still relatively high, the vehicle is considered to be in a deceleration condition.

If in fact the throttle valve 7 is completely or almost completely closed before the lapse of the predetermined period of time T1 in a situation such as example A-1, the control module 10 practically does not cause the automatic transmission 4 to shift up itself into the fourth gear. However, in a situation such as example A-2, the control module 10 actually causes the automatic transmission 4 to shift up into fourth gear after the lapse of the predetermined period of time T1.

Figure 4:
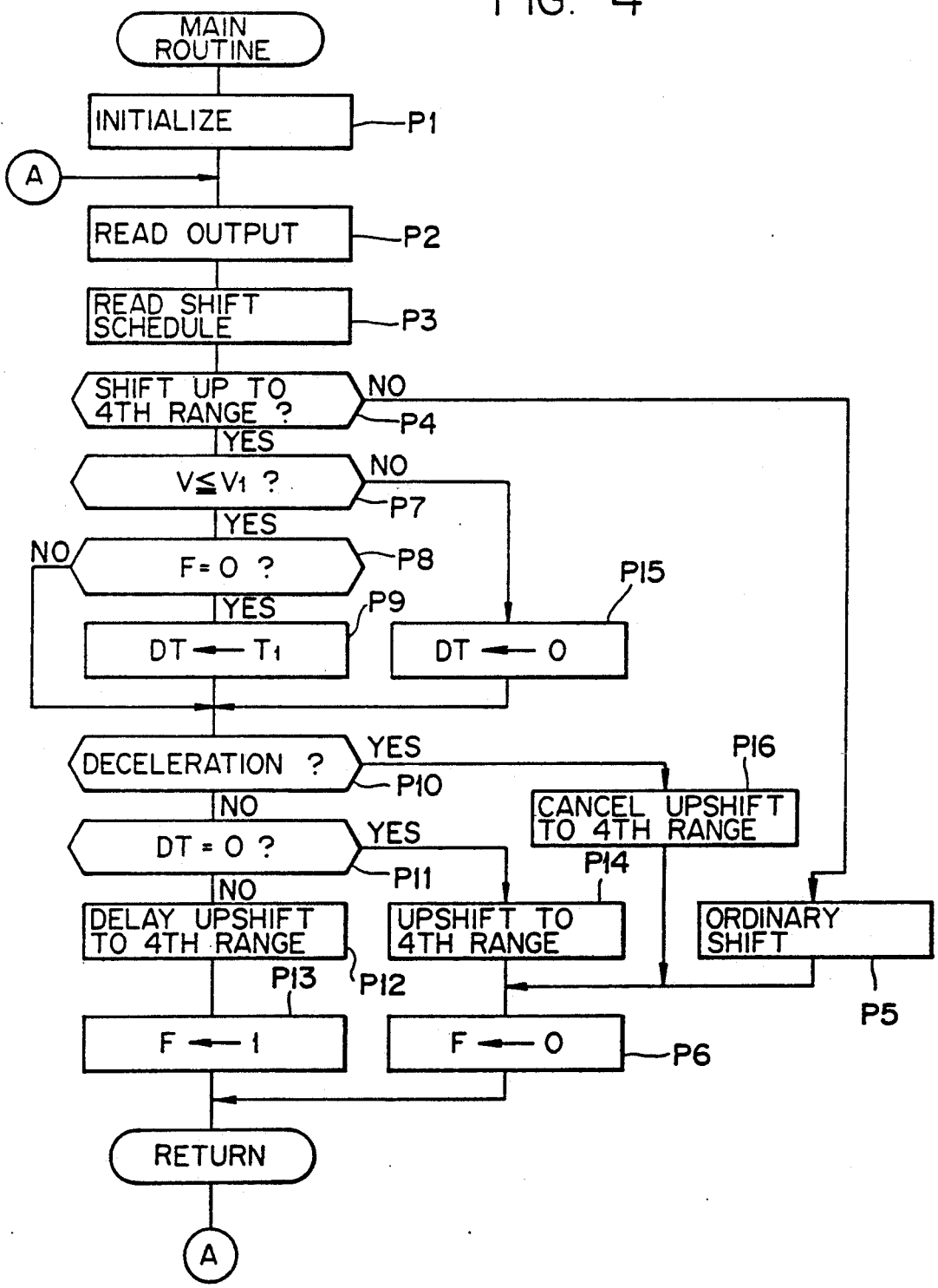
FIG. 4 is a flow chart illustrating a main routine for a microcomputer of a control module for controlling the automatic transmission control system in accordance with the shift control schedule shown in 2.
Figure 5:
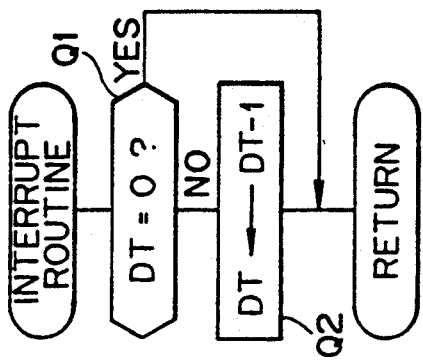
FIG. 5 is a flow chart illustrating an interrupt subroutine for a microcomputer of the control module shown in FIG. 2.

The operation of the automatic transmission depicted in FIG. 1 is best understood by reference to FIGS. 4 and 5, which are flow charts illustrating routines for the microcomputer of the control module 10. Programming a computer is a skill well understood in the art. The following description is written to enable a programmer having ordinary skill in the art to prepare an appropriate program for the microcomputer of the control module 10. The particular details of any such program would of course depend upon the architecture of the particular computer selected.

An interrupt routine, depicted as a flow chart in FIG. 5, operates to suspend the on-going main routine and is called for every predetermined period to count the predetermined period of time T1. It is noted that the clock timer is designed to set an initial count value DT to the predetermined period of time T1 and start counting down every time the throttle valve 7 reaches any opening in the fourth gear speed range. In the interrupt routine, a decision is made in a step Q1 to decide whether or not the clock timer has counted down the count value DT to zero (0). The final step of the interrupt routine orders return to the main routine either directly if the answer to the decision is yes indicating the predetermined period of time T1 has elapsed or, if the answer is no, after changing the counted value DT of the timer by a decrement of one (1) in a step Q2.

Referring to FIG. 4, which is a flow chart of the main routine in which the interrupt routine is conducted, the first step P1 is to initiate the automatic transmission control system. At this initiation, a shift delay flag F is reset. When the flag F is reset (F=0), the 3-4 upshift of the automatic transmission 4 is effected conventionally with no time lag. On the other hand, when the flag F is set (F=1), the 3-4 upshift of the automatic transmission 4 is effected with a delay of the predetermined time T1. After the initiation, a step P2 is taken to read the condition and outputs of the switch and sensors 11 to 15 and then a step P3 is taken to read the shift schedule so as to determine how the automatic transmission 4 is to shift itself.

The first decision in the main routine is made in a step P4: "should the 3-4 upshift of the automatic transmission 4 be effected?" If the answer to the decision is no, the automatic transmission 4 is shifted in a step P5 in accordance with the shift schedule determined in the step P3 and then a step P6 is taken to reset the flag F (F=0) and order return.

If the answer to the decision regarding to the 3-4 upshift of the automatic transmission 4 is yes, another decision is made in a step P7 to decide whether or not the vehicle speed is equal to or lower than the previously specified speed V1. If the answer to the decision in the step P7 is yes, the state of the flag F is read to decide whether the 3-4 upshift of the automatic transmission 4 should be delayed in a step P8. If the answer to the decision in step P8 is yes, this indicates the flag F has been reset (F=0), and hence, a state or condition of the throttle valve 7 immediately after the opening thereof has just changed to be in the fourth gear speed range, the clock timer sets the counts value DT to the predetermined period of time T1 in a step P9. On the other hand, if the answer to the decision regarding the state of the flag F is no, this indicates that the 3-4 upshift of the automatic transmission 4 is now being delayed, then, the step P9 is skipped so that the clock timer continues counting down.

In a step P10, a decision is made to decide whether or not the engine 1 is in the "near-idle deceleration condition". If the answer to the decision is yes, the step P6 is taken to reset the flag F (F=0) after canceling a 3-4 upshift control signal in a step P16 so as not to effect the 3-4 upshift of the automatic transmission 4 and order return. This process including the cancelation of 3-4 upshift the step P16 takes place when the vehicle is operated in a condition such as example A-1.

If the answer to the decision is no indicating that the vehicle is not in the "near-idle deceleration condition", a decision is made in a step P11: "is the counted value DT of the timer zero (0)?" If the answer to the decision is no, this indicates that the predetermined period of time T1 has not elapsed, then the program delays the provision of a 3-4 upshift signal in a step 12 and orders return after setting flag F (F=1) in a step 13. On the other hand, if the answer to the decision in the step P11 is yes indicating the lapse of the predetermined period of time T1, a 3-4 upshift control signal is provided in a step P14 so as to effect a 3-4 upshift of the automatic transmission. Thereafter, the program orders return after resetting the flag F (F=0) in the step P6. This process including the decision concerning the lapse of the predetermined period of time T1 in the step P11 takes place when the vehicle is operated in a condition such as the example A-2.

If the answer to the decision in step P7 is no, this indicates that the current vehicle speed is greater than the previously specified speed V1. Then, after setting the timer count value DT to zero (0) so as not to delay the shift of transmission, the decision in the step P10 is made to verify the "near-idle deceleration condition".

Figure 6:
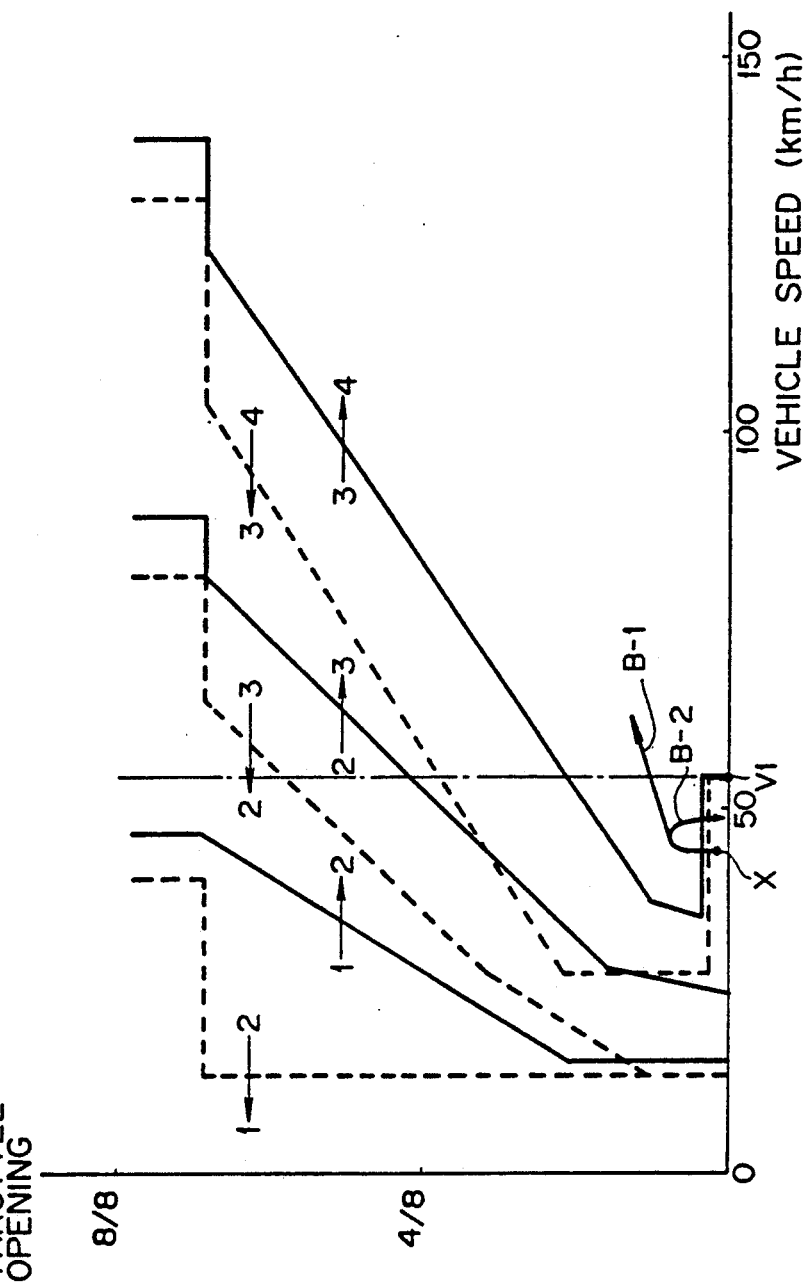
FIG. 6 is a diagram similar to FIG. 2 showing another example of a shift con schedule for the automatic transmission control system shown in FIG. 1.

Referring to FIG. 6 showing another example of shift pattern or schedule in accordance with which shift control of the automatic transmission is executed, as apparent from the diagram shown in FIG. 6, a 4-3 downshift control line along which downshift control is carried out from the fourth gear to the third gear, is designed to have a lower portion extending within the fourth gear speed range to the previously specified speed V1 near the idle position of the throttle. This is intended to make more efficient use of the braking power of lower gear upon braking the vehicle. The remaining shift control lines are designed similarly to those of the previous example.

Figure 7:
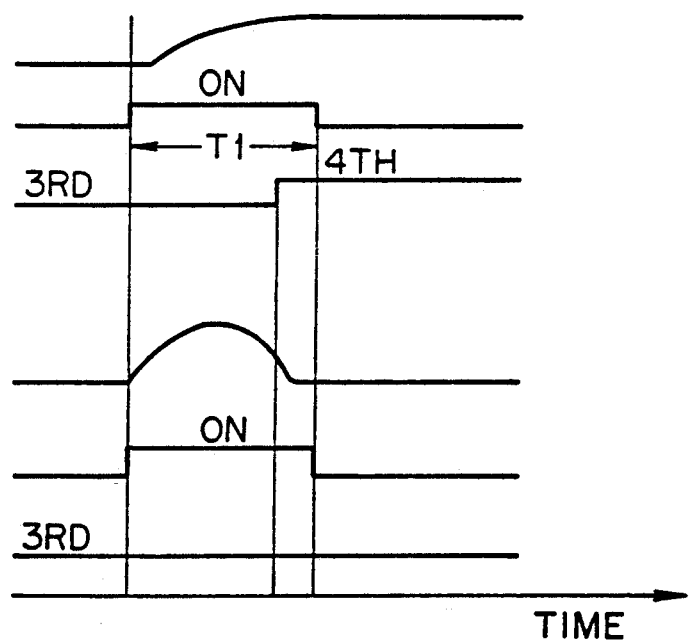
FIG. 7 a timing chart similar to FIG. 3 for controlling the transmission control system in accordance with the shift schedule shown in FIG. 7.

Similarly to the above described shift schedule, two examples of engine operation modes are considered, one of which is designated by a character B-1 and the other by a character B-2 in FIGS. 6 and 7. In example B-1 the vehicle is accelerated from a vehicle operating condition in particular a vehicle speed X, in the third gear range to a speed beyond the previously specified speed V1 in the fourth gear range, with increased opening of the throttle 7. The time needed before the operating speed of vehicle exceeds the previously specified speed V1 from the moment the operating condition of vehicle enters the fourth gear range is shorter than the predetermined period of time T1. On the other hand, in the example of engine operation B-2 the vehicle is accelerated from vehicle speed X in the third gear range and the operation condition of vehicle changes to again enter the third gear range before the lapse of the predetermined period of time T1 from the moment the operating condition of vehicle enters the fourth gear range.

When the vehicle is operated in this example B-2 where the operation condition of vehicle returns to the third gear range before the lapse of the predetermined period of time T1, the control module 10 practically does not cause the automatic transmission 4 to shift up into the fourth gear. However, in example B-1, the control module 10 actually causes the automatic transmission 4 to shift up into the fourth gear after the lapse of the predetermined period of time T1.

Figure 8:
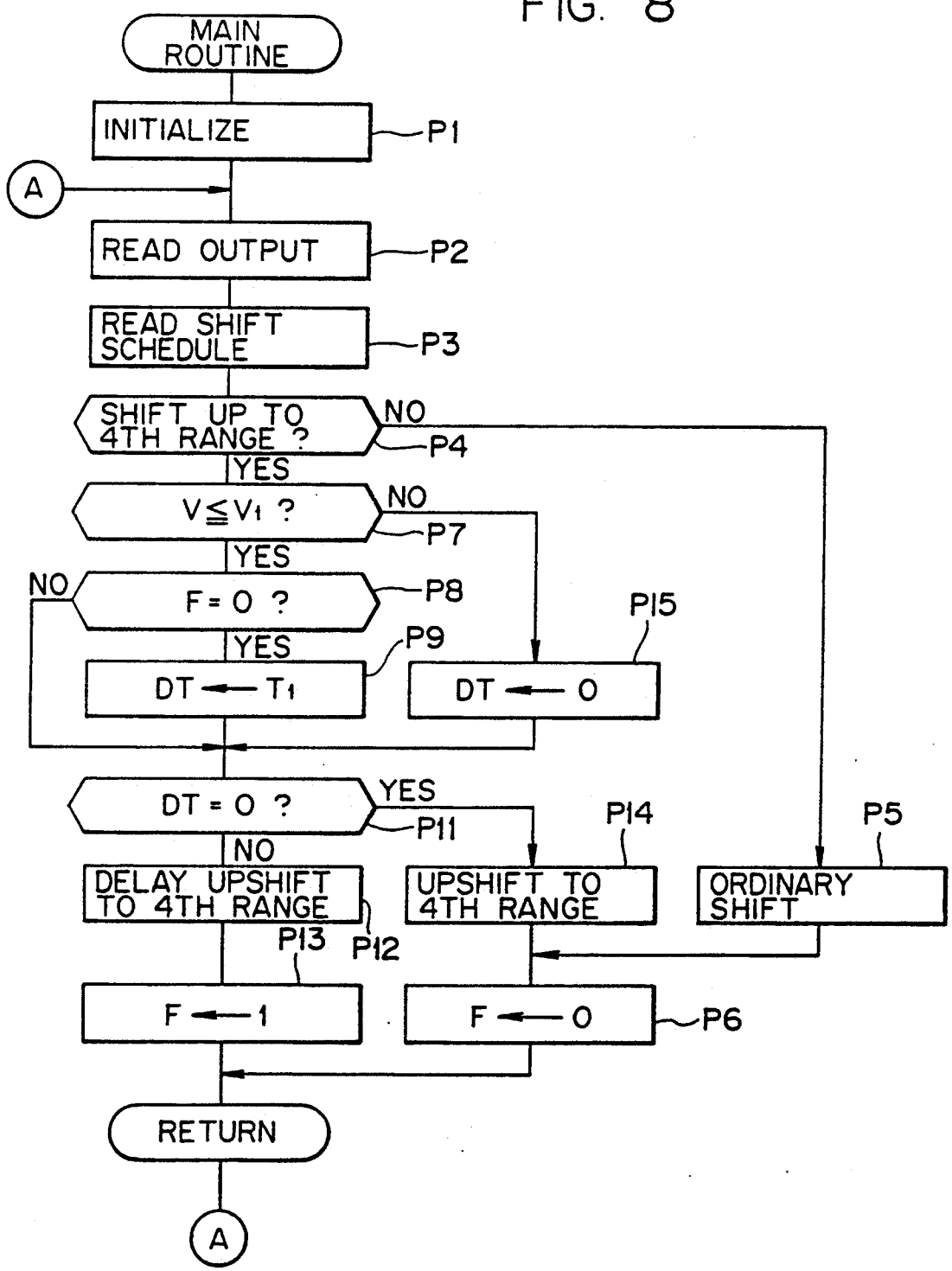
FIG. 8 is a flow chart illustrating a main routine for a microcomputer of the control module for controlling the automatic transmission in accordance with the shift control schedule shown in FIG. 6.

The operation of the automatic transmission depicted in FIGS. 1 and 2 for the examples of engine operation B-1 and B-2 is best understood with reference to FIG. 8, which is a flow chart illustrating a main routine for the microcomputer of the control module 10. The main routine shown in FIG. 8 is substantially the same as that of the previous example except for the omission of steps P10 and P16, and need not be explained in detail again. It is to be noted in this example that the same interrupt routine as shown in FIG. 5 operates to suspend the on-going main routine and is called for every predetermined period to count the predetermined period of time T1.

It should be noted that various changes and modifications are apparent to those skilled in the art which are within the scope of the invention, and such changes and modifications are intended to be covered by the following claims.

What is claimed is:

1. An automatic transmission control system for shifting a multi-step automatic transmission of an automotive vehicle, comprising:
    transmission operating means for shifting the transmission;
    speed detecting means for detecting a vehicle operating speed;
    a throttle opening sensor for detecting a throttle opening of a throttle value of said vehicle; and
    shift control means for (a) providing said transmission operating means with one of an upshift control signal and a downshift control signal according to a predetermined shift control schedule to determine a shift range to which the transmission is to shift, depending upon throttle opening and vehicle speed, so as to cause said transmission operating means to shift the transmission up or down; with a predetermined speed; (b) determining if said vehicle is decelerating when said throttle value of said vehicle is at least adjacent an idle position, (c) counting down a predetermined time; (d) delaying provision of said upshift control signal from said shift control means to said transmission operating means for said predetermined period of time when a shift to a particular shift range occurs and said vehicle is not decelerating when said throttle value is at least adjacent said idle position, and (e) canceling provision of said upshift control signal from said shift control means when said vehicle is determined to be in adjacent said idle position.

2. An automatic transmission control system as defined in claim 1, wherein said shift control means cancels the provision of said upshift control signal when said vehicle is in said deceleration condition and said throttle value is at least adjacent said idle position, a vehicle operating speed lower than said predetermined speed is detected within said predetermined period of time.

3. An automatic transmission control system as defined in claim 1, wherein said predetermined shift control schedule includes an upshift control line defining a lower portion of a particular speed range extending within a speed range adjacent to said particular speed range, to which the transmission is to shift up to from said particular speed range.

4. An automatic transmission control system as defined in claim 1, wherein said predetermined shift control schedule includes 3-4 upshift control line having a portion which defines a range of throttle openings adjacent to an idle position and extends to said predetermined speed in a fourth speed range.

5. An automatic transmission control system as defined in claim 2, wherein said predetermined shift control schedule includes an upshift and a downshift control line, each defining a lower portion of a particular speed range extending within a speed range adjacent to said particular speed range, to which the transmission is to shift up to from said particular speed range.

6. An automatic transmission control system as defined in claim 2, wherein said predetermined shift control schedule includes a 3-4 upshift control line and a 4-3 downshift control line, each having a portion of a third speed range in a lower range of throttle openings extending to said predetermined speed in a fourth speed range.

7. An automatic transmission control system for shifting a multi-step automatic transmission of an automatic vehicle, comprising:
    transmission operating means for shifting the transmission;
    speed detecting means for detecting a vehicle operating speed; and
    shift control means for (a) providing said transmission operating means with one of an upshift control signal and a downshift control signal according to a predetermined shift control schedule to determine a shift range to which the transmission is to shift, depending upon throttle opening and vehicle speed, so as to cause said transmission operating means to shift the transmission up or down; with a predetermined speed; (c) counting down a predetermined time; (e) delaying provision of said upshift control signal from said signal control means to said transmission operating means for said predetermined period of time when said vehicle is not decelerating when said throttle value is at least adjacent said idle position; and (e) allowing said shift control means to provide said upshift control signal immediately after said predetermined period of time has lapsed.

8. An automatic transmission control system as defined in claim 7, wherein said predetermined shift control schedule includes an upshift control line and a downshift control line, each defining a lower portion of a particular speed range extending within a speed range adjacent to said particular speed range, to which the transmission is to shift up from said particular speed range.

9. An automatic transmission control system as defined in claim 7, wherein said predetermined shift control schedule includes a 3-4 upshift control line and a 4-3 downshift control line, each having a portion of a third speed range in a lower range of throttle opening extending to said predetermined speed in a fourth speed range.

10. An automatic transmission control system as defined in claim 1, wherein said transmission operating means comprises an electromagnetic actuator.

11. An automatic transmission control system as defined in claim 7 wherein said transmission operating means comprises an electromagnetic actuator.

* * * * *